US006805325B1

United States Patent
Malmuth et al.

(10) Patent No.: US 6,805,325 B1
(45) Date of Patent: Oct. 19, 2004

(54) SURFACE PLASMA DISCHARGE FOR CONTROLLING LEADING EDGE CONTAMINATION AND CROSSFLOW INSTABILITIES FOR LAMINAR FLOW

(75) Inventors: Norman Malmuth, Newbury Park, CA (US); Alexander Fedorov, Moscow Region (RU)

(73) Assignee: Rockwell Scientific Licensing, LLC., Thousand Oaks, CA (US)

( * ) Notice: Subject to any disclaimer, the term of this patent is extended or adjusted under 35 U.S.C. 154(b) by 0 days.

(21) Appl. No.: 10/406,940

(22) Filed: Apr. 3, 2003

(51) Int. Cl.$^7$ .............................................. B64C 23/00
(52) U.S. Cl. ...................................... 244/205; 244/130
(58) Field of Search ............................... 244/198–209, 244/75 R, 130

(56) References Cited

U.S. PATENT DOCUMENTS

| | | | |
|---|---|---|---|
| 2,946,541 A | * 7/1960 | Boyd | 244/205 |
| 3,095,163 A | * 6/1963 | Hill | 244/12.1 |
| 3,325,123 A | * 6/1967 | Null | 244/176 |
| 3,556,443 A | * 1/1971 | Kidwell | 244/130 |
| 4,014,168 A | * 3/1977 | Carpenter | 60/202 |
| 4,813,631 A | 3/1989 | Gratzer | |
| 4,936,146 A | * 6/1990 | Stack et al. | 73/432.1 |
| 5,297,765 A | 3/1994 | Hughes et al. | |
| 5,538,201 A | 7/1996 | Gerhardt | |
| 5,692,709 A | 12/1997 | Mihora et al. | |
| 5,797,563 A | * 8/1998 | Blackburn et al. | 244/130 |
| 5,842,666 A | 12/1998 | Gerhardt et al. | |
| 5,944,287 A | 8/1999 | Rodgers | |
| 6,027,078 A | * 2/2000 | Crouch et al. | 244/204 |
| 6,247,671 B1 | * 6/2001 | Saeks et al. | 244/205 |
| 6,451,241 B1 | 9/2002 | Ohliger et al. | |
| 6,459,228 B1 | * 10/2002 | Szulyk et al. | 318/632 |
| 6,570,333 B1 | * 5/2003 | Miller et al. | 315/111.21 |

FOREIGN PATENT DOCUMENTS

| | | |
|---|---|---|
| WO | WO 98/47761 | 10/1998 |
| WO | WO 01/00488 A1 | 1/2001 |

OTHER PUBLICATIONS

Dovgal, A. V., Levchenko, V. Ya. and Timofeev, V. A. (1990) "Boundary layer control by a local heating of the wall," from: IUTAM Laminar–Turbulent Transition, eds. D. Arnal and R. Michel, Springer–Verlag, pp. 113–121.

Stephan Wilkinson "Go With The Flow", Air & Space/Smithsonian Magazine, Jun./Jul. 1995.

* cited by examiner

Primary Examiner—Galen Barefoot

(57) ABSTRACT

The present invention provides a system and method for controlling leading edge contamination and crossflow instabilities for laminar flow on aircraft airfoils that is lightweight, low power, economical and reliable. Plasma surface discharges supply volumetric heating of the supersonic boundary layers to control the Poll Reynolds number and the cross flow Reynolds number and delay transition to turbulent flow associated with the leading edge contamination and crossflow instabilities. A closed-loop feedback control system that incorporates these principles includes three primary components: heat-flow sensors, a PID controller, and plasma discharge elements. Heat-flow sensors distributed around the airfoil surface provide root-mean-square (rms) pulsations of the heat flow to the airfoil skin. These data are fed to the PID controller to determine the flow state (laminar or turbulent) and to drive voltage inputs to the plasma discharge elements, which provide the volumetric heating of the boundary layer on a time scale necessary to adapt to changing flight conditions and delay transition to turbulent flow.

13 Claims, 8 Drawing Sheets

SURFACE PLASMA DISCHARGE FOR CONTROLLING LEADING EDGE CONTAMINATION AND CROSSFLOW INSTABILITIES FOR LAMINAR FLOW

BACKGROUND OF THE INVENTION

1. Field of the Invention

This invention relates to aircraft laminar flow control (LFC) systems, and more specifically, to a method and system using plasma discharge to encourage laminar flow along the surface of a wing airfoil.

2. Description of the Related Art

Since the 1930s, laminar flow control (LFC) has been touted as the technology that would enable aircraft to sip fuel and shrug off drag, slipping through the air with the greatest of ease without reducing lift. Laminar flow is achieved by reducing the magnitude of disturbances and instabilities in the very thin and relatively stagnant layer of air between the skin of an aircraft and the free-stream air surrounding it call the "boundary layer." By keeping these fluctuations small, the nonlinear interactions leading to turbulence can be curtailed and/or delayed. Currently, the most robust methods for controlling the disturbance amplitudes are based on modifying the boundary layer mean flow via airfoil geometry (i.e., by tailoring the pressure gradient, $C_p$) or by applying surface suction. However, these methods have not delivered on the promise of LFC.

Since modifications to the pressure gradient do not actively consume power, this approach has been termed "natural laminar flow". The successful application of this approach and attainment of drag reduction benefits has been demonstrated both theoretically and in testing for nominally two-dimensional boundary layers. The main disadvantage of the natural laminar flow approach is that the modified $C_p$ distribution is generally unacceptable from an overall airplane performance point of view. For this reason, natural laminar flow is not frequently used for increasing the extent of laminar flow.

The use of suction has also been successfully tested to show improved laminar flow and reduced drag without the adverse restrictions on the $C_p$ distribution. However, the suction approach has its own shortcomings, including increased costs, added weight, and increased complexity of the overall flow-control system as compared to the baseline non-suction configuration. These shortcomings partially offset the performance savings. There are also potential performance penalties associated with suction applications, e.g., suction drag and increased roughness sensitivity due to thinner boundary layers. Additionally, the porous suction surface can require increased maintenance.

It is also known to use a combination of suction and pressure gradient tailoring (termed "hybrid laminar flow control") to effectively achieve laminar flow with more practical $C_p$ distributions. While the overall performance of the aircraft is improved to acceptable levels, the hybrid laminar flow control approach still suffers the shortcomings of the suction system.

The application of surface air cooling (to below the adiabatic surface temperature) has also been theorized to be an effective flow control technique. The general theory predicts that cooling of an airflow surface to lower than the adiabatic surface temperature will cool the passing boundary layer, which in turn will slow the development and growth of instabilities. Conceived surface cooling techniques, however, are thought to be impractical for large surface areas such as those in a large commercial transport. Because of this, the idea of surface cooling is not exploited in current aircraft configurations.

The beneficial effects of surface cooling have also been theorized to occur by application of local heat to a stable upstream region of the boundary layer. In theory, the heated upstream boundary layer then encounters a cooler downstream surface to result in a net temperature decrease experienced by the boundary layer that is similar to the net change in temperature achieved by simply cooling the downstream surface. This approach was demonstrated experimentally at TsAG1 and at I.T.A.M. in Russia during the mid-to-late 1980's. Specifically, the results showed that increased laminar flow could be achieved by localized heating in the leading-edge region of a flat plate. (See for example, Dovgal, A. V., Levchenko, V. Ya. and Timofeev, V. A. (1990) "Boundary layer control by a local heating of the wall," from: IUTAM Laminar-Turbulent Transition, eds. D. Arnal and R. Michel, Springer-Verlag, pp. 113–121). One of the problems in applying this alternative technique to airfoils has been the loss of performance benefit after only a relatively short period of time due to the transfer of heat from the boundary layer flow to the cooler surface downstream. As heat is transferred from the boundary layer flow, the surface temperature rises and the relative temperature difference between the flow and the surface diminishes. This reduces the stabilizing effect on the boundary layer and eventually terminates the laminar-flow benefit.

U.S. Pat. No. 6,027,078 to Crouch provides a localized heating system for use with an airfoil having a leading edge region, a controlled surface extending aft from the leading edge on one side of the airfoil, and an uncontrolled surface extending aft from the leading edge region on the opposite side of the airfoil. The heating system includes an electro-thermal heat source located at the leading edge region; and a heat sink positioned aft of the heat source and adapted for heat transfer from the controlled surface to the uncontrolled surface. The electro-thermal heat source modifies the pressure distributions around the airfoil to improve laminar flow. The transfer of heat by the heat sink improves the boundary layer airflow along the controlled surface. Crouch's electro-thermal surface heating has a long relaxation time that makes it ineffective in responding to real-time changes in flight conditions and is very inefficient in heating flow over the vehicle surface.

In summary, the drag reduction benefits of having laminar airflow have been known for many years, however, there are few economically viable laminar airflow control systems available. The general problem has been that the increased costs required to achieve sustained laminar flow substantially erodes the potential benefits. Usually, the laminar flow control system does improve laminar flow over an aerodynamic surface (e.g., wing, nacelle, vertical tail, etc.) and improve overall aircraft performance, but the benefits of the system are more than offset by the increased costs in manufacturing, maintenance, aircraft weight, design complexity, operational costs, reliability, etc. Thus, a need exists for a laminar flow control means that is low cost and low maintenance. The ideal system would further have minimum impact on the weight and configuration complexity of the aircraft.

SUMMARY OF THE INVENTION

The present invention provides a system and method for controlling leading edge contamination and crossflow instabilities for laminar flow on aircraft airfoils that is light weight, low power, economical and reliable.

This is accomplished with plasma surface discharges that supply volumetric heating of the supersonic boundary layers to control the Poll Reynolds number and the cross flow Reynolds number and delay transition to turbulent flow associated with the leading edge contamination and crossflow instabilities. A closed-loop feedback control system that incorporates these principles includes three primary components: heat-flow sensors, a PID controller, and plasma discharge elements. Heat-flow sensors distributed around the airfoil surface provide root-mean-square (rms) pulsations of the heat flow to the airfoil skin. These data are fed to the PID controller to determine the flow state (laminar or turbulent) and to drive voltage inputs to the plasma discharge elements, which provide the volumetric heating of the boundary layer on a time scale necessary to adapt to changing flight conditions and delay transition to turbulent flow.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a system and method for controlling leading edge contamination and crossflow instabilities of laminar flow on aircraft airfoils that is light weight, low power, economical and reliable. This is accomplished by plasma injection into boundary layers to delay leading edge contamination and crossflow instabilities. Plasma surface discharges are used to supply volumetric heating of the boundary layer that leads to stabilization of flow instabilities via reduction of the Poll Reynolds and cross flow Reynolds numbers and increase of the boundary layer thickness. A closed-loop feedback control system that incorporates these principles includes three primary components: heat-flow sensors, a PID controller, and plasma discharge elements. The heat-flow sensors distributed over the wing leading-edge region sense the root-mean-square (rms) heat-flow pulsations. This data is fed to the PID controller to determine the flow state (laminar or turbulent) and adjust the drive conditions for the plasma discharge elements, which provide the volumetric heating of the boundary layer on a time scale necessary to adapt to changing flight conditions.

Figure 1:
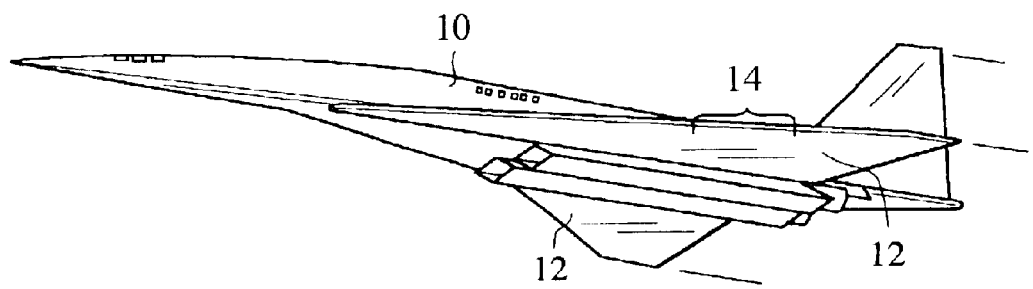
FIG. 1 is a perspective view of a swept wing aircraft in flight illustrating the region of the wing subject to laminar flow control.
Figure 2:
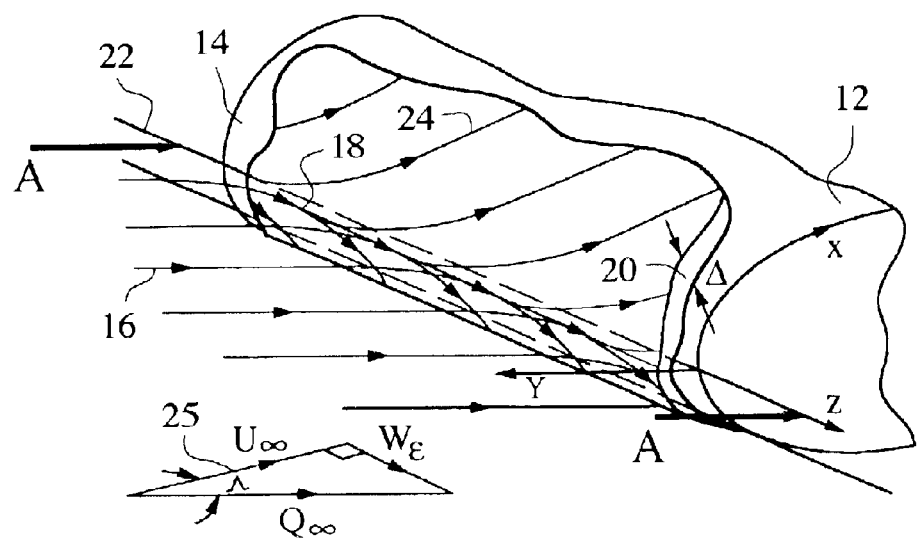
FIG. 2 is an enlarged view of the region of the wing illustrating airflow at the leading edge.

As shown in FIGS. 1 and 2, aircraft 10 designed for high-speed flight generally have wings 12 with swept leading edges 14. The free stream 16 interacts with the leading edge 14 of wing 12 and forms three-dimensional flow containing boundary layers 18 and 20 along attachment line 22 and diverging streamlines 24, respectively.

The flow in the boundary layer 18 is characterized by the Poll Reynolds number R* where $$R_* = \frac{W_e \Delta_*}{V_{e*}} \quad (1)$$

$$\Delta_* = \sqrt{V_{e*} / \left(\frac{\partial U_e}{\partial X}\right)_{y=0}} \quad (2)$$

where $\Delta^*$ is the boundary layer thickness, $W_e$ is the flow velocity along attachment line 10; $\partial U_e/\partial X$ is the chordwise velocity gradient at the attachment line; subscript "e" denotes flow characteristics at the upper edge of boundary layer 18; $v_{e*}$ is kinematic viscosity evaluated at the reference temperature $$T_e = 0.1(T_w - T_e) + 0.6(T_f - T_e) \quad (3)$$

where $T_w$ is wall temperature and $T_r$ is recovery temperature. Directions of U and W are given by velocity triangle 25; coordinates X,Y,Z are shown in FIG. 2.

Figure 3:
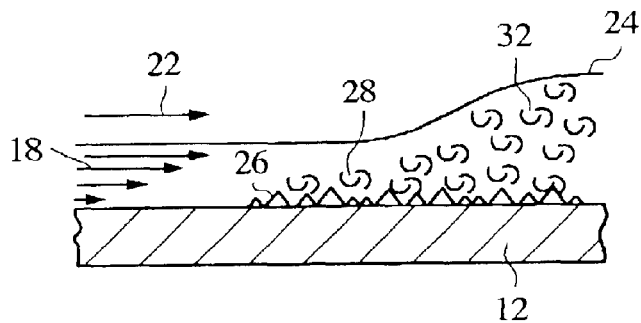
FIG. 3 is a cross-sectional view of the wing along section A—A with the boundary layer transitioning to turbulent flow due to contamination of the wing leading edge.
Figure 4:
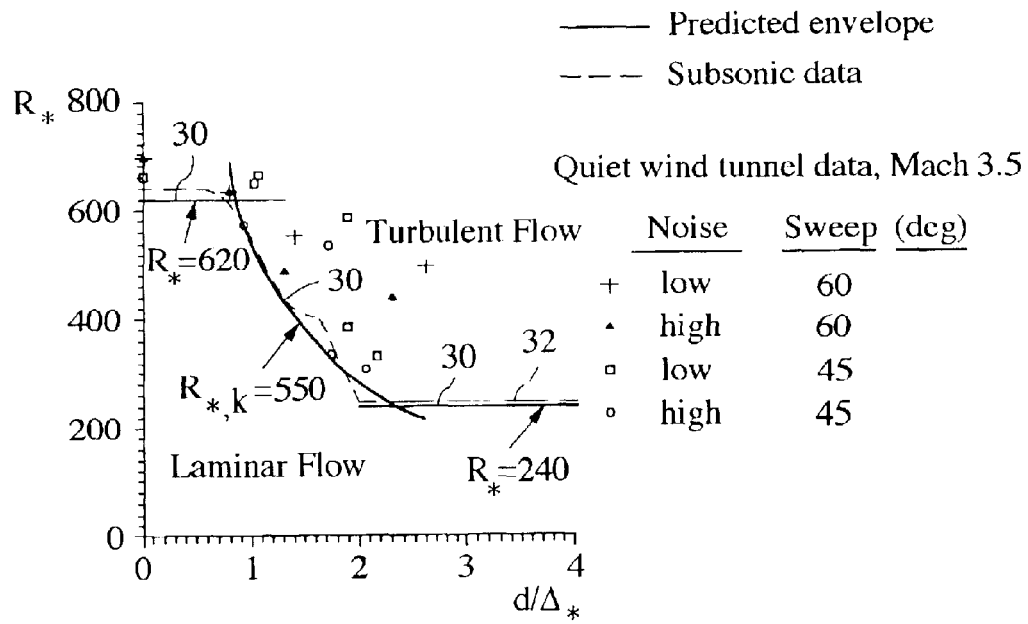
FIG. 4 is a plot of the Poll Reynolds number versus the roughness height referenced to the boundary layer thickness.
Figure 5:
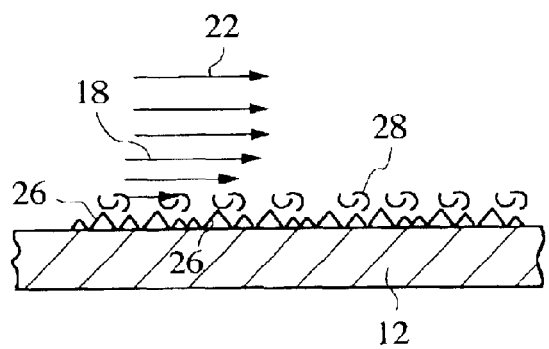
FIG. 5 is a cross-sectional view of the wing along section A—A illustrating laminarization of the boundary layer due to plasma discharge heating in accordance with the invention.

As shown in the cross-section view of wing leading edge 14 in FIG. 3, the boundary layer flow 18 along attachment line 22 may be contaminated by roughness elements 26 on wing 12, which induce flow disturbances 28. If the Poll Reynolds number R* is larger than a critical level 30, shown in FIG. 4, as a function of the ratio of the roughness height d to the boundary layer thickness $\Delta^*$, then roughness elements 26 cause a transition of boundary layer 18 to turbulent flow 32. Turbulent flow 32 propagates along streamlines 24 and covers the major portion of the wing surface. As shown in FIG. 4, for R* below $R_{*C} \approx 250$ 32, the flow stays laminar irrespective of the roughness height. Plasma heating increases gas temperature $T_e$ and wall temperature $T_w$ that leads to increasing of kinematic viscosity $v_{e*}$ and decreasing of R* in accordance with (1)–(3). This allows for maintaining of the Poll Reynolds number below critical level 30. In this case, flow disturbances 28 induced by roughness elements 26 dissipate downstream and laminar boundary layer 18 does not transition to turbulent flow as shown in FIG. 5. Moreover, the boundary layer thickness $\Delta^*$ increases due to the plasma heat, which in turn leads to a reduction of the relative roughness height $d\Delta$.

Figure 6B:
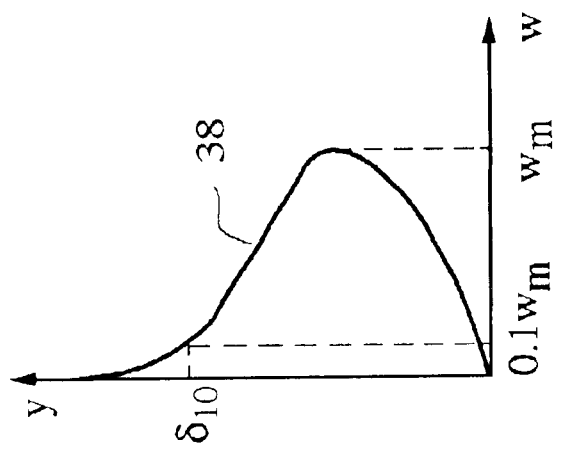
FIGS. 6a and 6b are an illustration of the amplification of cross flow vortices in boundary layer and a plot of the cross flow velocity profile, respectively.
Figure 6A:
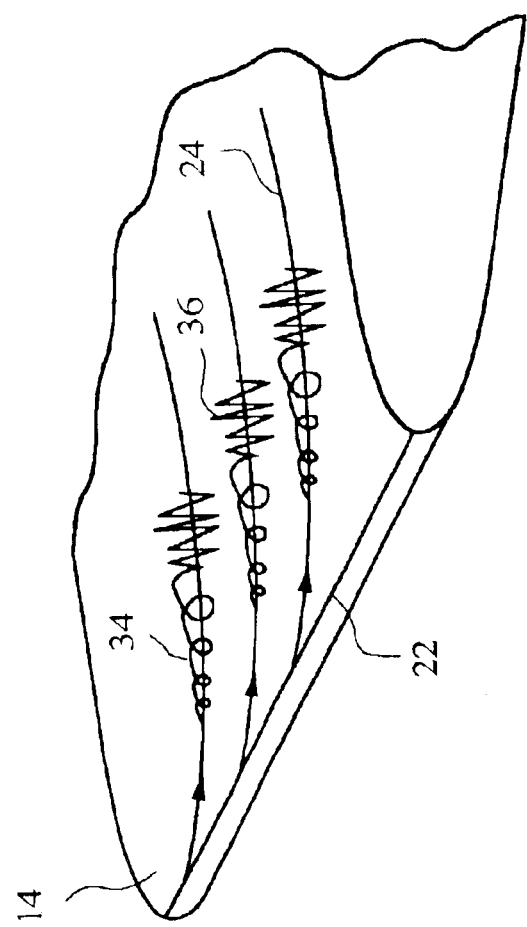

Another mechanism of laminar-turbulent transition is associated with the amplification of cross flow vortices 34 in the boundary layer 20 along streamlines 24 as schematically shown in FIG. 6a. When the amplitude of cross flow instability is larger than a critical level, vortices 34 breakdown into turbulent spots 36 and eventually the flow becomes turbulent. The growth rates of vortices 34 depend on the cross flow Reynolds number $R_{CF}$, which is $$R_{CF} = \frac{w_m \delta_{10}}{v_e} \tag{4}$$

where $w_m$ is the maximum of cross flow velocity in boundary layer 20 and $\delta_{10}$ is the vertical distance from the wall at which cross flow velocity 38 is $w=0.1\ w_m$ as shown in FIG. 6b.

Experiments on swept wings at low speeds indicate that the first appearance of cross flow vortices 34 corresponds to $R_{CF,0} \approx 145$, and the transition front is close to the wing leading edge at $R_{CF,1} \approx 200$. To account for compressibility effects at high speeds, the cross flow Reynolds number is scaled as $$\overline{R}_{CF} = \frac{R_{CF}}{1 + \frac{\gamma-1}{2}\sqrt{Pr}\, M_e^2}, \tag{5}$$

where $\gamma$ is specific heat ratio, Pr is Prandtl number and $M_e$ is local Mach number at the upper edge of boundary layer 20. For $R_{CF} < R_{CF,0}$, cross flow vortices are stable and laminar-turbulent transition due to cross flow instability does not occur. As in the case of leading edge contamination, plasma heating increases gas and wall temperatures, which leads to an increase of kinematic viscosity $v_e$ and a reduction of $R_{CF}$. Thus plasma heating can maintain the cross flow Reynolds number below the critical level $R_{CF,0}$ and avoid transition of the flow to a turbulent state.

Figure 7:
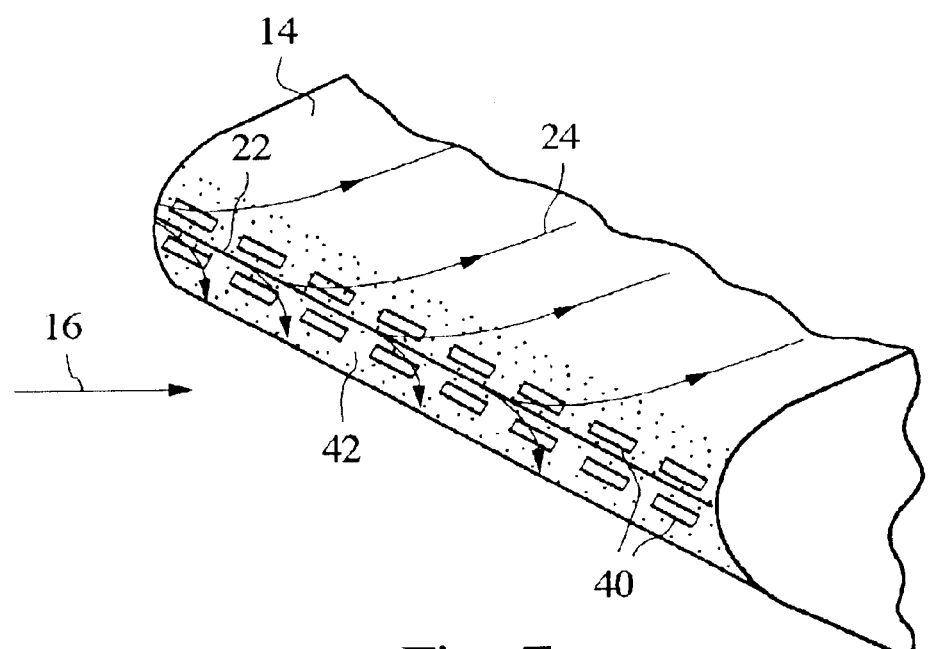
FIG. 7 is a perspective close-up view of the region of the wing showing the electrodes and the region of flow heating.
Figure 8:
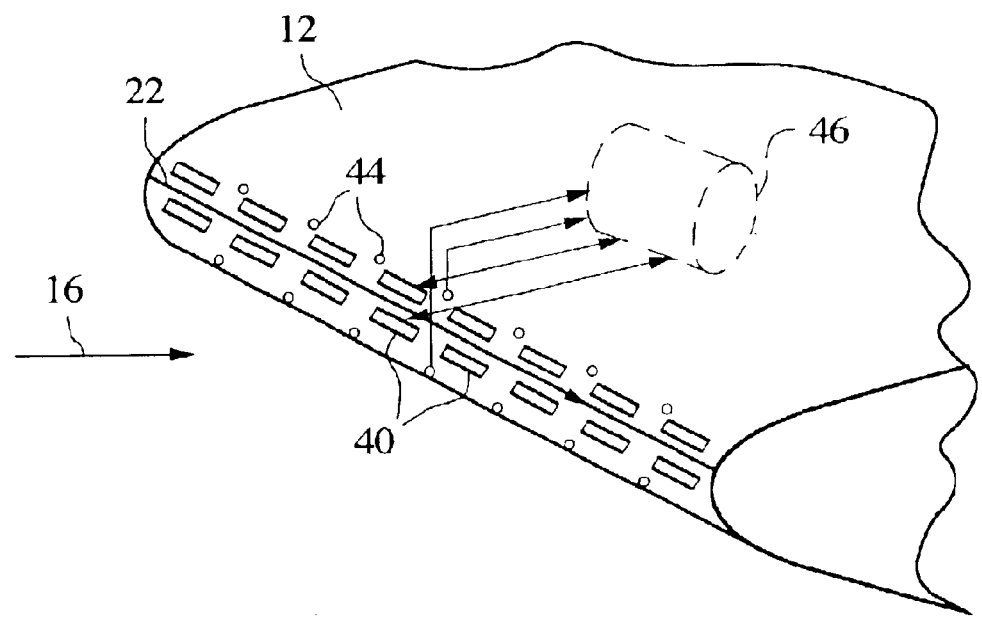
FIG. 8 is a perspective close-up view of the leading edge of a wing showing the key components of the present invention including the electrodes, PID controller and sensors.
Figure 9B:
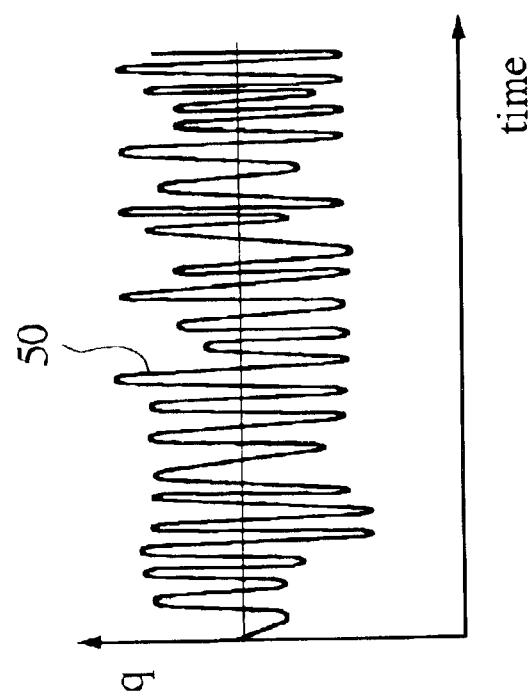
FIGS. 9a and 9b are heat flow signals in laminar and turbulent flows.
Figure 9A:
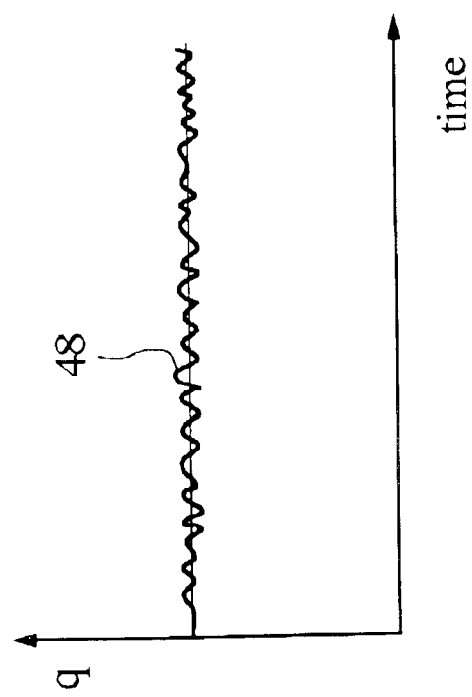

Plasma surface discharges are used in this invention to supply volumetric heating of the boundary layer to reduce the Poll Reynolds and cross flow Reynolds numbers to maintain laminar flow. As shown in FIG. 7, pairs of electrodes 40 are distributed along attachment line 22 on the leading edge 14. In region 42 around attachment line 22, the flow temperature increases due to Joule heating produced by plasma discharges between the pairs of electrodes 40. The increase in flow temperature reduces the Poll Reynolds and cross flow Reynolds numbers to below their critical levels to maintain laminar flow FIG. 8 shows a closed-loop laminar flow control system that incorporates these principles. The system includes three primary components: heat-flow sensors 44, a PID controller 46, and plasma discharge electrodes 40 installed along attachment line 22 on wing 12. Heat-flow sensors 44 are distributed along the wing-span downstream from plasma discharge electrodes 40. Sensors 44 provide heat flow pulsations 48 (in laminar flow) and 50 (in turbulent flow) on the wing surface as shown in FIGS. 9a and 9b. The pulsation amplitude q strongly depends on the flow state: in laminar flow q is an order of magnitude smaller than that in turbulent flow (compare 48 and 50). The difference between rms fluctuations in turbulent and laminar flows allows for determination of the flow state (laminar or turbulent). This data is fed to a PID controller 46 to identify the flow state and adjust the voltage required for plasma discharge electrodes 40 that provide the volumetric heating of boundary layer 18 along attachment line 22 on a time scale necessary to adapt to changing flight conditions. Electrodes 40 are suitably located near attachment line 22 at cruise flight conditions.

For laminar flow control, PID controller 46 controls the flow heating at the level required for maintaining the laminar flow.

Figure 10B:
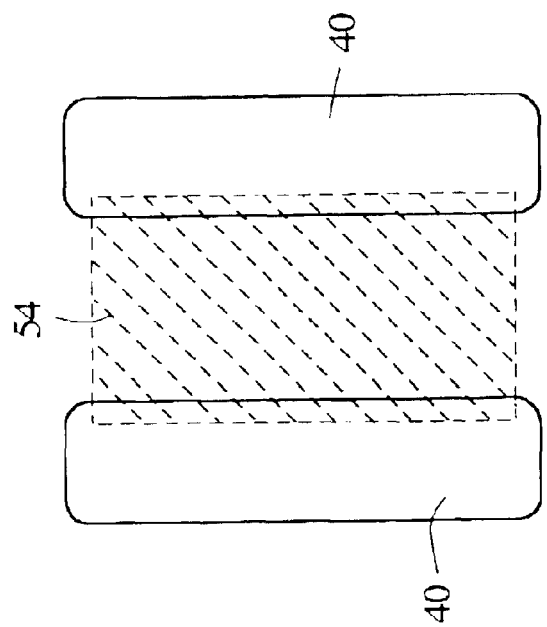
FIGS. 10a and 10b are side and top views of a plasma discharge circuit, respectively.
Figure 10A:
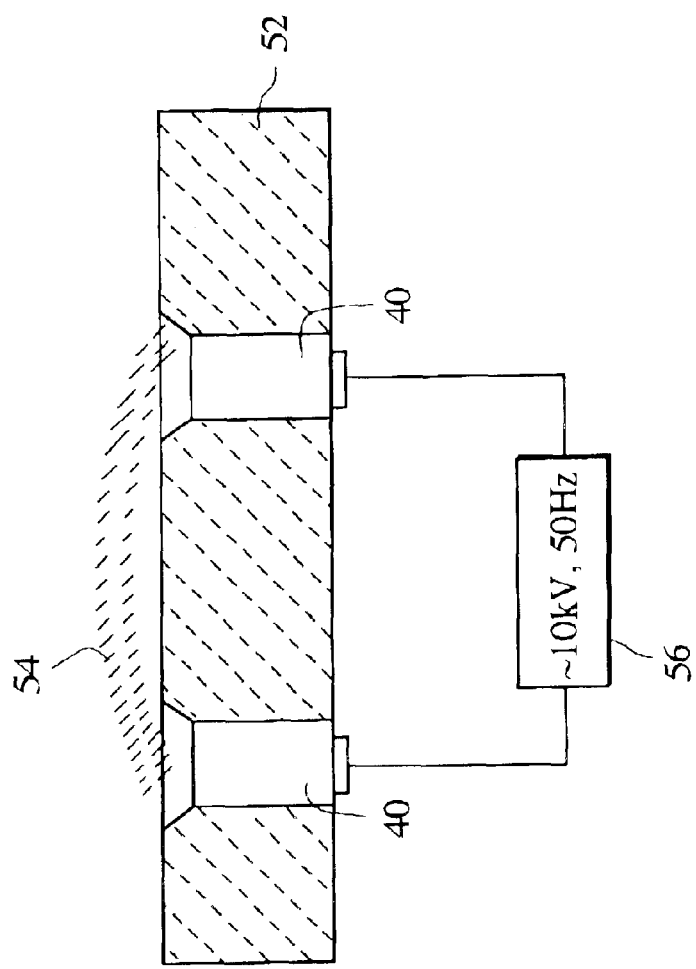

As shown in FIG. 10a, plasma discharge electrodes 40 are suitably flush mounted in a dielectric substrate 52. As shown in FIG. 10b, discharge 54 occurs across a gap between electrodes 40. Voltage generator 56 provides enough potential to break down the air gap. Typical component parameters are a 10 kV direct voltage supply with 50 Hz frequency connected to a 50–150 mA working current and 600–800 V discharge gap voltage with the arc supporting 40–100 W of electrical power. Above the breakdown potential, PID controller 46 controls the potential to adjust the amount and location of volumetric heating. Other embodiments may use corona, spark, slipping or sliding discharges.

Figure 11A:
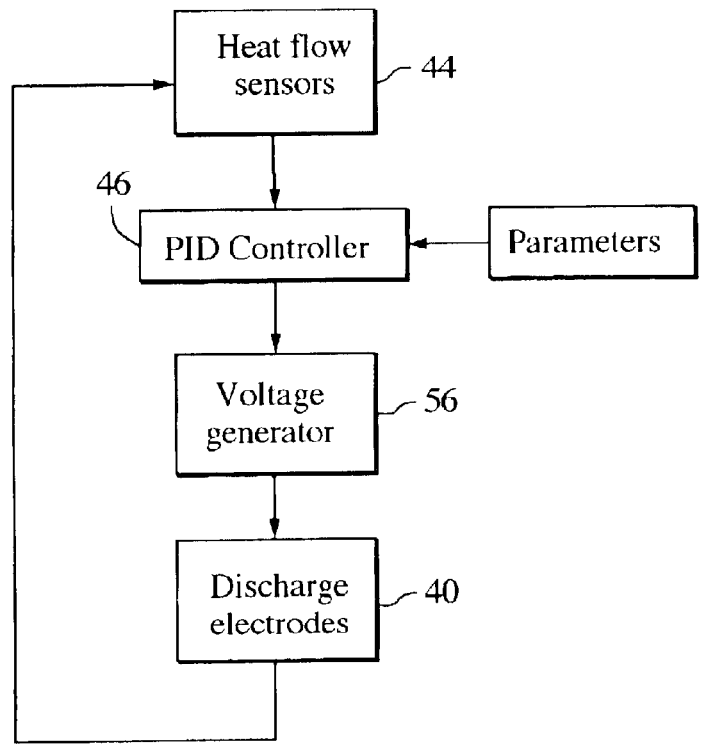
FIGS. 11a and 11b are a schematic block diagram of the control system and a flow chart illustrating the closed loop feedback control scheme, respectively.
Figure 11B:
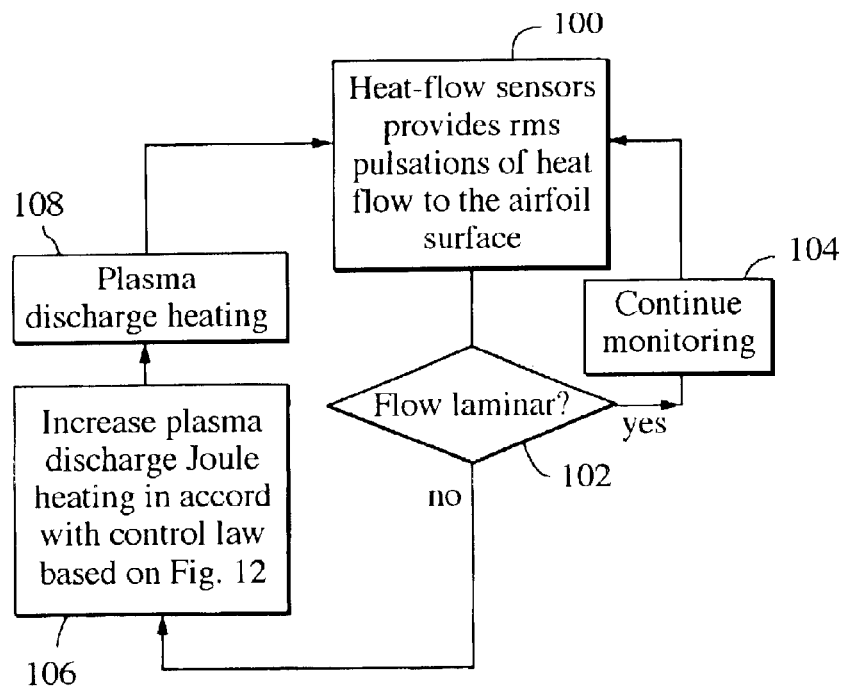

As shown in FIGS. 11a and 11b, PID controller 46 receives the heat flow readings from heat-flow sensors 44 (step 100), and, based on these readings, compares the measured flow state to the desired laminar state (step 102). If flow is laminar, the controller continues to monitor the heat flow readings (step 104). If not, the PID controller increases voltages for voltage generator 56 to drive plasma discharge elements 40 (step 106) to provide plasma discharge Joule heating to reduce the Poll Reynolds number with the control law based on a curve 60 in FIG. 12 and the cross flow Reynolds number (step 108). Steps 100, 102, 106 and 108 are repeated to converge to the desired laminar flow and continuously adapt to changing flight conditions.

Figure 12:
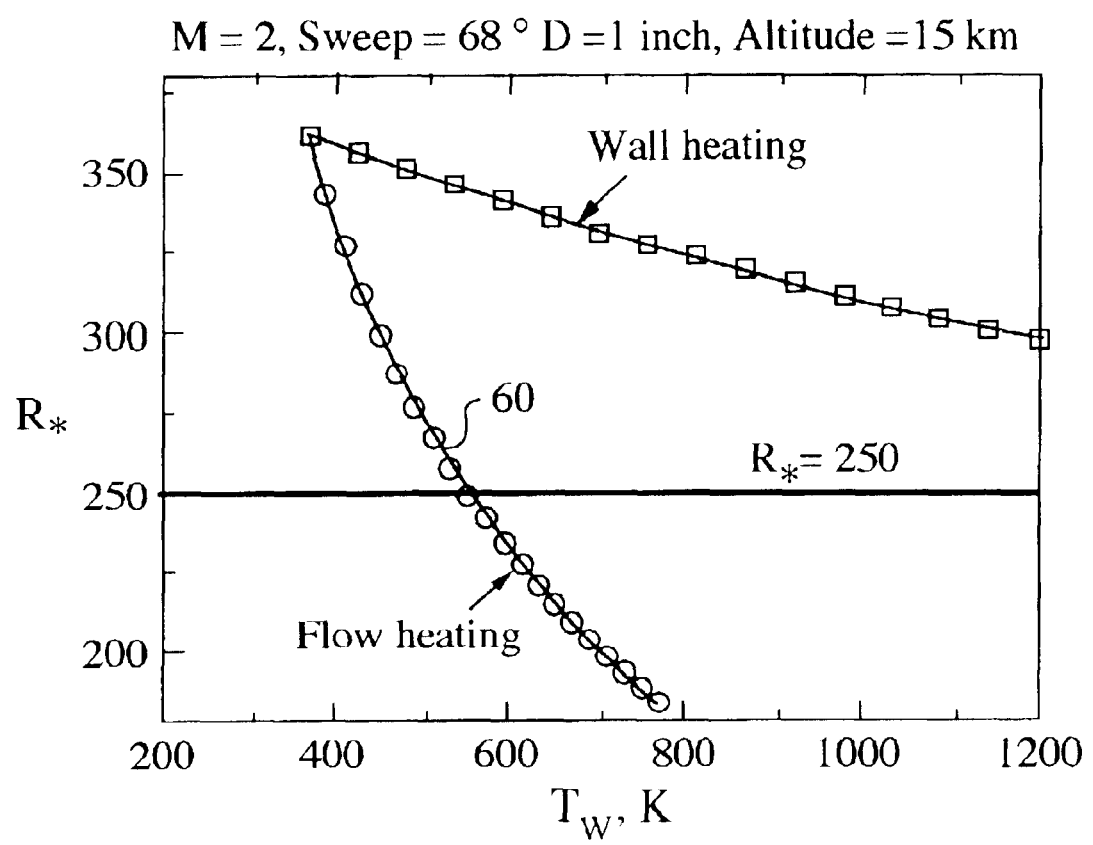
FIG. 12 is a curve of the Poll Reynolds number as a function of the wall temperature.

The general calibration and empirical testing for characterizing laminar and turbulent flow states are known in the art. The contribution of the present invention is to realize that plasma discharges can be used to provide volumetric heating on a short time scale of microseconds to adjust the Poll Reynolds number to achieve laminar flow and to estimate the amount of Joule heating, e.g. plasma discharge, required to achieve the goal. To provide the basis for the control law for the scheme in FIGS. 11a and 11b, particularly step 106, a first-cut theoretical model was developed to evaluate the Poll Reynolds number as a function of the wall temperature. This dependence 60 is shown in FIG. 12 for a leading edge of 1-inch diameter and 68 degrees sweep for flight at altitude 15 km and a Mach number of 2. As the wall temperature increases, the Reynolds number R* decreases and quickly falls below the critical level $R_{*C}=250$. This trend verifies the premise that a plasma discharge can effectively control leading edge contamination. A similar dependence can be obtained for the cross flow Reynolds number $R_{CF}$ and used for evaluation of plasma heating level required for stabilization of cross flow vortices 34.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An aircraft, comprising:
    an airfoil having a leading edge, whereby air flow interacts with the leading edge to create a first boundary layer, characterized by a Poll Reynolds number, along an attachment line and a second boundary layer, characterized by a cross flow Reynolds number, along diverging streamlines, and
    plasma discharge elements distributed along the attachment line, said plasma discharge elements being adapted to generate a plasma to volumetrically heat the first and second boundary layers, thereby maintaining the Poll Reynolds number below a first critical value along the attachment line and maintaining the cross flow Reynolds number below a second critical value along the streamlines to delay the onset of turbulent flow.

2. The aircraft of claim 1, wherein the plasma discharge elements comprise multiple pairs of electrodes.

3. The aircraft of claim 1, further comprising:

heat flow sensors located near the leading edge of the air foil to sense whether the air flow over the airfoil is laminar or turbulent; and a controller that responds to an output of the heat flow sensors to adjust the plasma discharge elements.

4. The aircraft of claim 3, wherein the heat flow sensors are located on the airfoil downstream from the plasma discharge elements.

5. The aircraft of claim 3, wherein the controller responds on a time-scale sufficient to adapt to changing flight conditions.

6. The aircraft of claim 3, wherein the controller comprises a PID controller.

7. An aircraft, comprising:

an airfoil having a leading edge whereby air flow interacts with the leading edge to creates a first boundary layers, characterized by a Poll Reynolds number, along an attachment line and a second boundary layer, characterized by a cross flow Reynolds number, along diverging streamlines, and plasma discharge elements distributed along the attachment line, said plasma discharge elements being adapted to generate a plasma to volumetrically heat the first and second boundary layers, thereby maintaining the Poll Reynolds number below a first critical value along the attachment line and maintaining the cross flow Reynolds numbers below a second critical values along the streamlines to delay the onset of turbulent flow.

8. The aircraft of claim 7, further comprising:

heat flow sensors located near the leading edge of the air foil downstream from the plasma discharge elements to sense whether the air flow over the airfoil is laminar or turbulent; and a controller that responds to an output of the heat flow sensors to adjust the plasma discharge elements.

9. An aircraft, comprising:

an airfoil having a leading edge, whereby air flow interacts with the leading edge to create a first boundary layer, characterized by a Poll Reynolds number, along an attachment line and a second boundary layer, characterized by a cross flow Reynolds number, along diverging streamlines, plasma discharge elements distributed along the attachment line, said plasma discharge elements being adapted to generate a plasma to volumetrically heat the first and second boundary layers, thereby maintaining the Poll Reynolds number below a first critical value along the attachment line and maintaining the cross flow Reynolds number below a second critical value along the streamlines to delay the onset of turbulent flow heat flow sensors located near the leading edge of the air foil downstream from the plasma discharge elements to sense whether the boundary layers are laminar or turbulent; and a controller that responds to an output of the heat flow sensors to control the plasma discharge elements to generate the plasma.

10. A method of delaying the transition to turbulent flow over an air foil having a leading edge, whereby air flow interacts with the leading edge to create a first boundary layer, characterized by a Poll Reynolds number, along an attachment line and a second boundary layer, characterized by a cross flow Reynolds number, along diverging streamlines, comprising the steps of:

generating a plasma along the attachment line to volumetrically heat the boundary layers, thereby maintaining the Poll Reynolds number below a first critical value along the attachment line and maintaining the cross flow Reynolds number below a second critical value along the streamlines to delay the onset of turbulent flow.

11. The method of claim 10, further comprising,

Sensing the laminar or turbulent state of the air flow, and

Controlling the plasma discharge.

12. The method of claim 11, wherein the laminar or turbulent state is sensed downstream from the plasma discharge.

13. A method of delaying the transition to turbulent flow over an airfoil having a leading edge, wherein air flow interacts with the leading edge to create a first boundary layer, characterized by a Poll Reynolds number, along an attachment line and a second boundary layer, characterized by a cross flow Reynolds number, along diverging streamlines, comprising the steps of:

generating a plasma along the attachment line to volumetrically heat the first and second boundary layers;

sensing the laminar or turbulent state of the air flow downstream for the plasma discharge, and controlling the plasma discharge, thereby maintaining the Poll Reynolds number below a first critical value along the attachment line and maintaining the cross flow Reynolds number below a second critical value along the streamlines to delay the onset of turbulent flow.

* * * * *